(12) United States Patent
Hotta

(10) Patent No.: US 12,357,915 B2
(45) Date of Patent: Jul. 15, 2025

(54) ADVERTISING DISPLAY SYSTEM, METHOD FOR DISPLAYING ADVERTISING IN VIRTUAL SPACE, AND CALCULATING FEES FOR THE ADVERTISING

(71) Applicant: DENTSU INC., Tokyo (JP)

(72) Inventor: Mihoko Hotta, Tokyo (JP)

(73) Assignee: DENTSU INC., Tokyo (JP)

( * ) Notice: Subject to any disclaimer, the term of this patent is extended or adjusted under 35 U.S.C. 154(b) by 64 days.

(21) Appl. No.: 18/001,010

(22) PCT Filed: Jun. 2, 2021

(86) PCT No.: PCT/JP2021/020977
§ 371 (c)(1),
(2) Date: Dec. 7, 2022

(87) PCT Pub. No.: WO2021/251235
PCT Pub. Date: Dec. 16, 2021

(65) Prior Publication Data
US 2023/0219003 A1 Jul. 13, 2023

(30) Foreign Application Priority Data
Jun. 9, 2020 (JP) ................................. 2020-099864

(51) Int. Cl.
*A63F 13/61* (2014.01)
*A63F 13/833* (2014.01)
*G06Q 30/0273* (2023.01)

(52) U.S. Cl.
CPC ............ *A63F 13/61* (2014.09); *A63F 13/833* (2014.09); *G06Q 30/0274* (2013.01); *A63F 2250/22* (2013.01); *A63F 2300/8082* (2013.01)

(58) Field of Classification Search
CPC .... A63F 13/61; A63F 13/833; A63F 2250/22; A63F 2300/8082; A63F 13/211;
(Continued)

(56) References Cited

U.S. PATENT DOCUMENTS

2005/0216346 A1* 9/2005 Kusumoto ......... G06Q 30/0267
705/14.15
2008/0204449 A1 8/2008 Dawson et al.
(Continued)

FOREIGN PATENT DOCUMENTS

CN 110476179 A 11/2019
JP 2010-003203 A 1/2010
(Continued)

OTHER PUBLICATIONS

Method and Apparatus For Targeted Advertising in Alternate Reality Environments Based on Expressed Virtual Avatar Persona and End-User Social Profile Authors et al.: IBM Original Publication Date: Oct. 14, 2009 (Year: 2009).*
(Continued)

*Primary Examiner* — Alexandru Cirnu
(74) *Attorney, Agent, or Firm* — Studebaker Brackett PLLC

(57) ABSTRACT

An advertising display system includes: an advertising display unit which displays advertising on an avatar operated by a user in a virtual reality space; a contact information acquiring unit which acquires information on contact times of the avatar in the virtual reality space with other avatars operated by other users and the number of the other avatars; and an advertising fee calculating unit which calculates an advertising fee to be applied to each of the user and the other users based on the information on the contact times and the number of other avatars acquired by the contact information acquiring unit.

8 Claims, 8 Drawing Sheets

(58) Field of Classification Search
CPC ...... A63F 13/212; A63F 13/25; A63F 13/428; A63F 13/5255; G06Q 30/0274; G06Q 30/02; G06Q 30/0273
See application file for complete search history.

(56) References Cited

U.S. PATENT DOCUMENTS

| | | | |
|---|---|---|---|
| 2009/0132361 | A1 | 5/2009 | Titus et al. |
| 2010/0036729 | A1* | 2/2010 | Hamilton, II ...... G06Q 30/0251 705/14.49 |
| 2011/0128281 | A1* | 6/2011 | Bhogal ............... G06F 3/04815 345/419 |
| 2012/0158473 | A1 | 6/2012 | Cox et al. |
| 2017/0003740 | A1* | 1/2017 | Verfaillie ................ A63F 13/87 |
| 2019/0091565 | A1* | 3/2019 | Nelson ................ G07F 17/3216 |
| 2020/0368616 | A1* | 11/2020 | Delamont ............ H04N 13/239 |
| 2021/0103958 | A1 | 4/2021 | Ippitsu |

FOREIGN PATENT DOCUMENTS

| | | | |
|---|---|---|---|
| JP | 2019-141164 A | 8/2019 | |
| KR | 10-2006-0120751 A | 11/2006 | |
| KR | 10-2009-0049165 A | 5/2009 | |
| WO | WO-2010070778 A1 * | 6/2010 | ............. A63F 13/10 |

OTHER PUBLICATIONS

International Search Report issued in PCT/JP2021/020977; mailed Jul. 6, 2021.
"Notice of Reasons for Refusal" Office Action issued in JP 2020-099864; mailed by the Japanese Patent Office on Jun. 29, 2021.
"Decision to Grant a Patent" Office Action issued in JP 2020-099864; mailed by the Japanese Patent Office on Sep. 7, 2021.
An Office Action mailed by China National Intellectual Property Administration on Apr. 11, 2025, which corresponds to Chinese Patent Application No. 202180036198.7 and is related to U.S. Appl. No. 18/001,010.

* cited by examiner

FIG. 4C
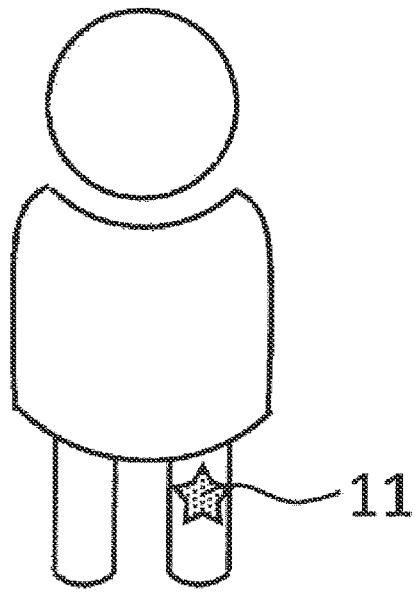
FIG. 5A
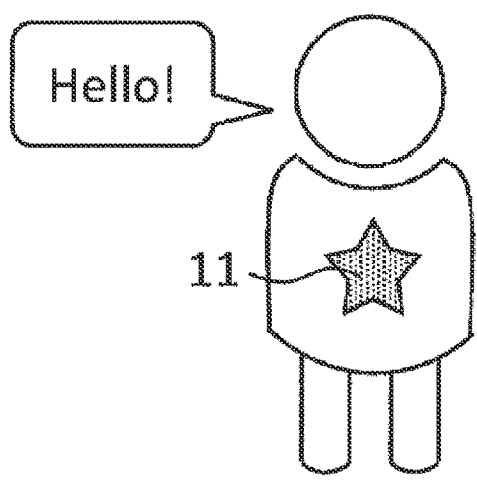 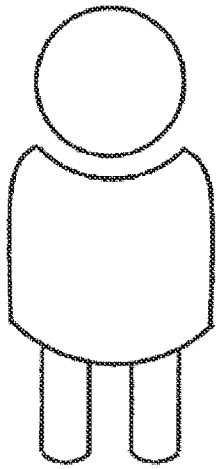 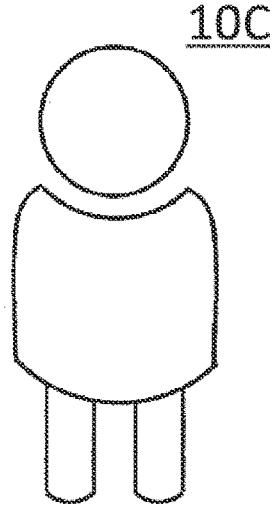

ADVERTISING DISPLAY SYSTEM, METHOD FOR DISPLAYING ADVERTISING IN VIRTUAL SPACE, AND CALCULATING FEES FOR THE ADVERTISING

TECHNICAL FIELD

The present disclosure relates to an advertising display system which displays advertising to a user in a virtual space.

BACKGROUND ART

Techniques for displaying advertising to a user in a virtual space have been conventionally proposed. For example, Japanese Patent Laid-Open No. 2019-141164 (Patent Literature 1) proposes a technique for drawing a logo as advertising on a costume worn by a character operated by a user in a virtual space where a fighting game is performed.

SUMMARY OF INVENTION

While a virtual space characteristically enables all data including attributes and activity logs of avatars operated by users and interchange among avatars to be monitored, there have been no proposals whatsoever for displaying advertising with a focus on such characteristics of virtual spaces. The costume advertising described in Patent Literature 1 is firmly focused on advertising display during a fight and imparting a benefit to users who are participants of the fight, and no benefits are imparted to spectators watching the fight.

It is desirable that a mechanism for effectively generating awareness of advertising and disseminating the advertising through interchange among avatars in a virtual space is provided.

An advertising display system according to an aspect of the present disclosure includes:
- an advertising display unit which displays advertising on an avatar operated by a user in a virtual reality space;
- a contact information acquiring unit which acquires information on contact times of the avatar in the virtual reality space with other avatars operated by other users and the number of the other avatars; and
- an advertising fee calculating unit which calculates an advertising fee to be applied to each of the user and the other users based on the information on the contact times and the number of other avatars acquired by the contact information acquiring unit.

An advertising display method according to an aspect of the present disclosure includes the steps of:
- displaying advertising on an avatar operated by a user in a virtual reality space;
- acquiring information on contact times of the avatar in the virtual reality space with other avatars operated by other users and the number of the other avatars; and
- calculating an advertising fee to be applied to each of the user and the other users based on the information on the contact times of the avatar in the virtual reality space with other avatars and the number of the other avatars.

BRIEF DESCRIPTION OF DRAWINGS

FIG. 4C is a diagram for explaining another example of a display position and a display size of advertising displayed on an avatar.

FIG. 5A is a diagram for explaining an aspect of a contact among avatars.

DESCRIPTION OF EMBODIMENT

Figure 1:
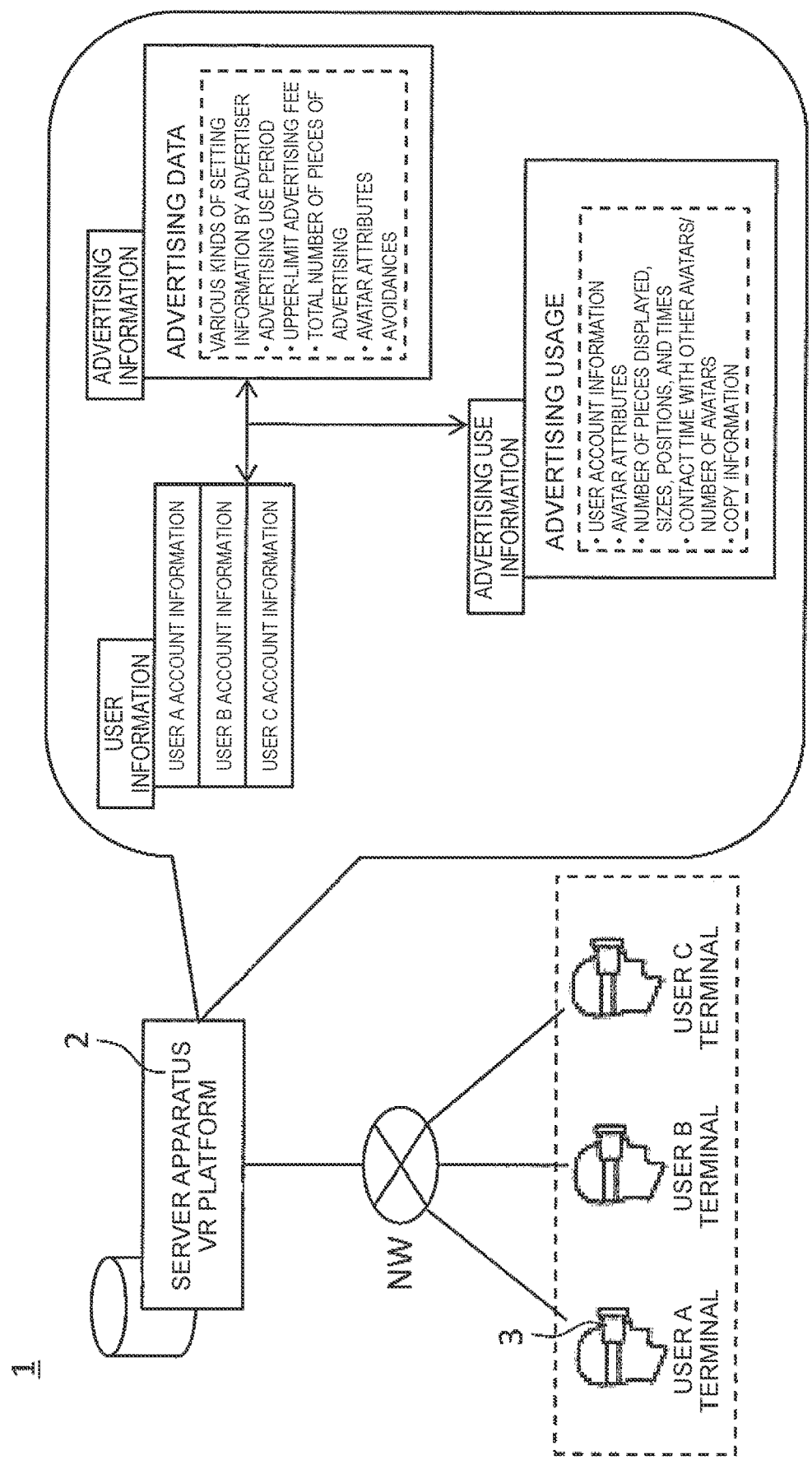
FIG. 1 is a diagram showing a schematic configuration of an advertising display system according to an embodiment.

An advertising display system according to a first aspect of an embodiment includes:
- an advertising display unit which displays advertising on an avatar operated by a user in a virtual reality space;
- a contact information acquiring unit which acquires information on contact times of the avatar in the virtual reality space with other avatars operated by other users and the number of the other avatars; and
- an advertising fee calculating unit which calculates an advertising fee to be applied to each of the user and the other users based on the information on the contact times and the number of other avatars acquired by the contact information acquiring unit.

According to the aspect described above, an advertising fee can be calculated based on a contact time of an avatar on which advertising is displayed in a virtual reality space with other avatars and the number of the other avatars. In addition, an advertising fee is applied not only to a user operating the avatar on which advertising is displayed but also to other users operating other avatars which the avatar had come into contact according to calculations based on contact times. Accordingly, the user operating the avatar on which advertising is displayed is motivated to come into contact with other avatars, and since an advertising fee is also applied to other users operating other avatars which the avatar had come into contact, the users around the user operating the avatar on which advertising is displayed can favorably accept contact. Therefore, due to promotion of interchange with the avatar on which advertising is displayed in a virtual reality space, awareness of the advertising can be generated and the advertising can be disseminated in an effective manner through interchange among avatars. Furthermore, since actual recognition of the advertising by a user can be confirmed by contact, advertising effectiveness can be measured and a structure of application of an advertising fee as compensation can be clarified even to advertisers.

An advertising display system according to a second aspect of the embodiment is the advertising display system according to the first aspect, wherein the advertising fee calculating unit calculates the advertising fee by further taking into consideration at least one of the number of pieces of advertising displayed on the avatar, display sizes of the pieces of advertising, display positions of the pieces of advertising, and display times of the pieces of advertising.

An advertising display system according to a third aspect of the embodiment is the advertising display system according to the second aspect, wherein the advertising display unit is capable of selecting and/or modifying, based on an operation by the user, at least one of the number of pieces of advertising displayed on the avatar, display sizes of the pieces of advertising, display positions of the pieces of advertising, and display times of the pieces of advertising.

According to the aspect described above, since a user can freely select and modify, at any time, the number of pieces, the display sizes, the display positions, and the display times of advertising displayed on an avatar, the user can construct an advertising display style to the user's liking, and since an advertising fee changes accordingly, a mechanism of displaying advertising on the avatar only after the user is convinced to do so can be constructed.

An advertising display system according to a fourth aspect of the embodiment is the advertising display system according to any one of the first to third aspects, wherein the contact information acquiring unit acquires, as a contact time, any of a time during which the other avatar continuously gazes on advertising displayed on the avatar in the virtual reality space, a time during which the avatar and the other avatars are in a state of conversation, and a time during which the avatar and the other avatars have approached each other within a distance determined in advance.

An advertising display system according to a fifth aspect of the embodiment is the advertising display system according to any one of the first to fourth aspects, wherein the advertising display unit is capable of copying, based on an operation by the other users, advertising displayed on the avatar onto the other avatars.

According to the aspect described above, since advertising displayed on an avatar can be readily copied onto another avatar, the number of displayed pieces of advertising itself in a virtual reality space increases and advertising effectiveness can be increased. In addition, a mechanism in which a user being a copy destination copies advertising onto an avatar only after being convinced to do so can be constructed. In other words, since copying is performed based on an operation by a user being a copy destination who wishes to copy advertising, convincingness perceived by the user being the copy destination is enhanced, advertising is no longer imposed from a user being a copy source or an advertiser, defamation risks to the advertising and the brand can be reduced, and a mechanism effective for both users and advertisers can be realized.

An advertising display method according to a sixth aspect of the embodiment includes the steps of:

displaying advertising on an avatar operated by a user in a virtual reality space;

acquiring information on contact times of the avatar in the virtual reality space with other avatars operated by other users and the number of the other avatars; and calculating an advertising fee to be applied to each of the user and the other users based on the information on the contact times of the avatar in the virtual reality space with other avatars and the number of the other avatars.

Hereinafter, a specific example of an embodiment will be described in detail with reference to the accompanying drawings. Note that, in the following description and the drawings referred to in the description, portions which may be configured in the same manner will be denoted by same reference signs and overlapping descriptions will be omitted.

FIG. 1 is a diagram showing a schematic configuration of an advertising display system 1 according to an embodiment. The advertising display system 1 is a system which displays advertising to a user in a virtual reality space.

As shown in FIG. 1, the advertising display system 1 includes a server apparatus 2 and a plurality of user terminals 3. The server apparatus 2 and the plurality of user terminals 3 are connected to be capable of communicating with each other via a network NW such as the Internet. The network NW may be any of a wired communication line or a wireless communication line and a type or a form of the communication line is not restricted. At least a part of the server apparatus 2 and the user terminals 3 is realized by a computer.

Among the advertising display system 1, the user terminal 3 is to be used by a user and is, for example, a head-mounted display (HMD), a personal computer (PC), a smartphone, or a tablet terminal.

Figure 3:
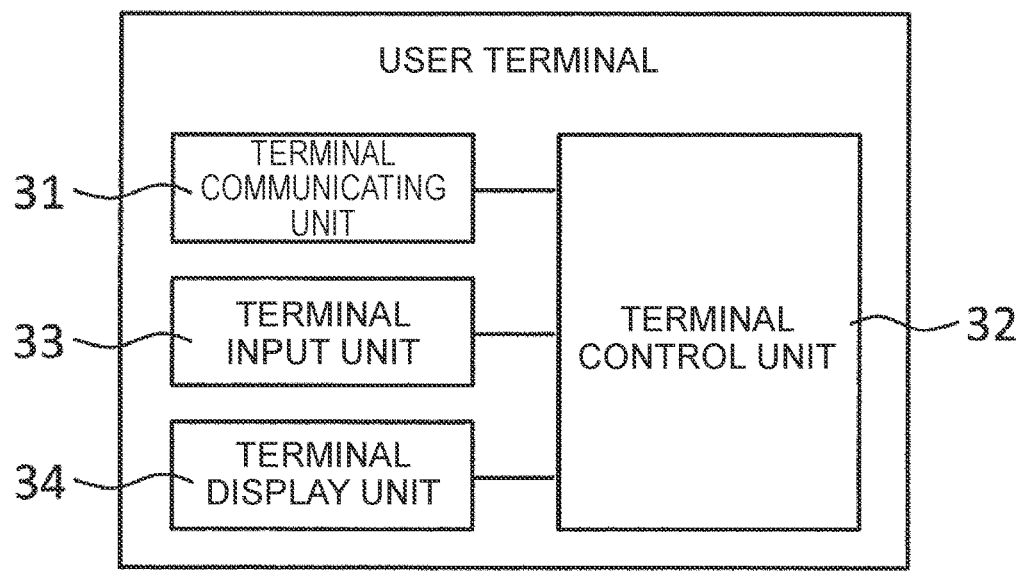
FIG. 3 is a block diagram showing a configuration of a user terminal.

FIG. 3 is a block diagram showing a configuration of the user terminal 3. As shown in FIG. 3, the user terminal 3 includes a terminal communicating unit 31, a terminal control unit 32, a terminal input unit 33, and a terminal display unit 34. Each of the units 31 to 34 are connected via a bus to be capable of communicating with each other.

The terminal communicating unit 31 is a communication interface between the user terminal 3 and the network NW. The terminal communicating unit 31 transmits and receives information between the user terminal 3 and the server apparatus 2 via the network NW.

The terminal control unit 32 is control means which performs various kinds of processing of the user terminal 3. The terminal control unit 32 may be realized by a processor in the user terminal 3 by executing a predetermined program or may be implemented by hardware.

The terminal input unit 33 is an interface used by a user to input information to the user terminal 3 and is, for example, a hand-held controller in a head-mounted display, a touch panel or a microphone in a smartphone or a tablet terminal, or a touchpad, a keyboard or a mouse in a personal computer. In this case, the hand-held controller in the head-mounted display includes at least one operation button and may have various built-in sensors for detecting an orientation and a motion (acceleration, rotation, and the like) of the controller. Due to an operation input from the terminal input unit 33, the user can move an avatar or cause the avatar to make an utterance in the virtual reality space.

The terminal display unit 34 is an interface for displaying various kinds of information to the user from the user terminal 3 and is, for example, video displaying means such as a liquid crystal display. When the user terminal 3 is a head-mounted display, the terminal display unit 34 is video display means which is mounted to the head of the user and which covers a field of view of both eyes of the user. The user wearing the head-mounted display can view video displayed on the terminal display unit 34. The terminal display unit 34 displays objects (electronic files) of any other type including a still image, a moving image, a document, and a website. A display mode of the terminal display unit 34 is not particularly limited and a mode may be adopted in which an object is displayed at any position in a virtual space (virtual reality space) with depth or a mode may be adopted in which an object is displayed at any position on a virtual plane.

Next, the server apparatus 2 will be described. While the server apparatus 2 is made up of one computer in the illustrated example, the server apparatus 2 is not limited to this configuration and may be made up of a plurality of computers connected to be capable of communicating with each other via a network.

Figure 2:
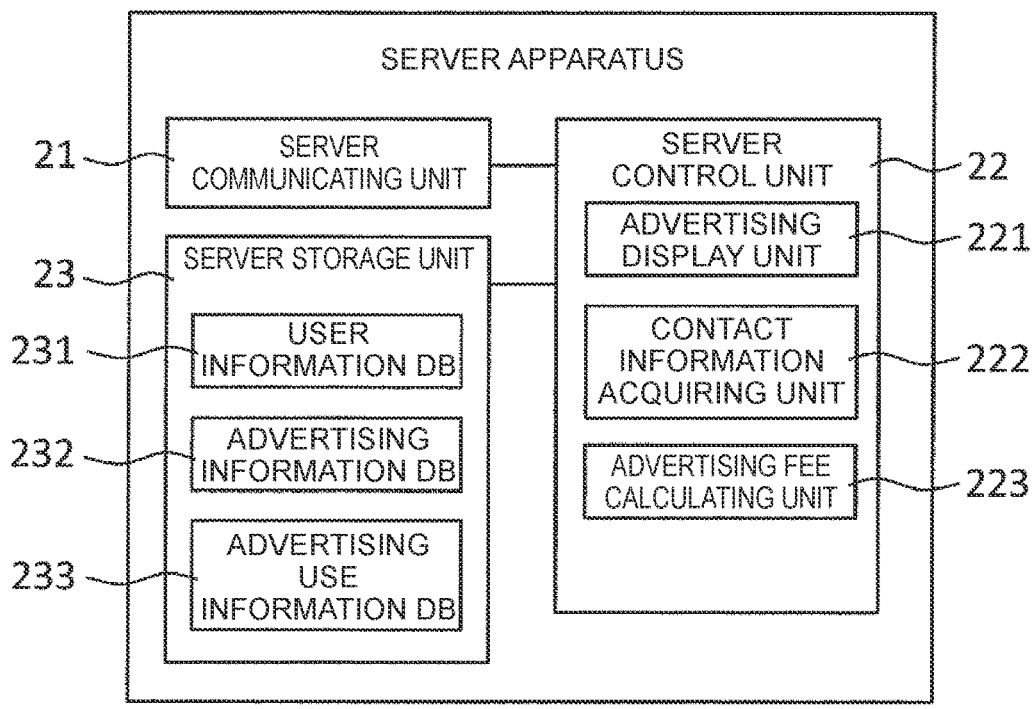
FIG. 2 is a block diagram showing a configuration of a server apparatus.

FIG. 2 is a block diagram showing a configuration of the server apparatus 2. As shown in FIG. 2, the server apparatus 2 includes a server communicating unit 21, a server control unit 22, and a server storage unit 23. Each of the units 21 to 23 are connected via a bus or a network to be capable of communicating with each other.

Among the units, the server communicating unit 21 is a communication interface between the server apparatus 2 and the network NW. The server communicating unit 21 transmits and receives information between the server apparatus 2 and each user terminal 3 via the network NW.

The server storage unit 23 is, for example, a non-volatile data storage such as a flash memory. Various kinds of data handled by the server control unit 22 are stored in the server storage unit 23. For example, the server storage unit 22 includes a user information database 231, an advertising information database 232, and an advertising use information database 233.

Referring to FIG. 1, for each user, the user information database 231 stores account information (for example, a user ID, a password, information on an avatar that can be operated by the user, and information on a bank account into which an advertising fee is to be deposited) of the user.

The advertising information database 222 stores advertising data provided by the advertiser. Advertising data is to be displayed (for example, pasted) on an avatar in the virtual reality space and may be either still image data or moving image data. In addition, display of advertising data may change over time or change depending on the environment. The advertising information database 222 may store, for each piece of advertising data, various kinds of setting information (for example, an advertising use period, an upper-limit advertising fee (per avatar/whole), total number of pieces of advertising, avatar attributes, and avoidances) designated by the advertiser.

The advertising use information database 233 stores information (advertising use information) related to advertising usage acquired from the user terminal 3. As advertising use information, the advertising use information database 233 may store account information of a user operating an avatar on which advertising is displayed, avatar attributes of the avatar, the number of pieces, display sizes, display positions, and display times of advertising displayed on the avatar, contact times of the avatar with other avatars/number of avatars, and copy information indicating that advertising has been copied from the avatar to another avatar.

As shown in FIG. 2, the server control unit 22 includes an advertising display unit 221, a contact information acquiring unit 222, and an advertising fee calculating unit 223. Each of the units 221 to 223 may be realized by a processor in the server apparatus 2 by executing a predetermined program or may be implemented by hardware.

Figure 4A:
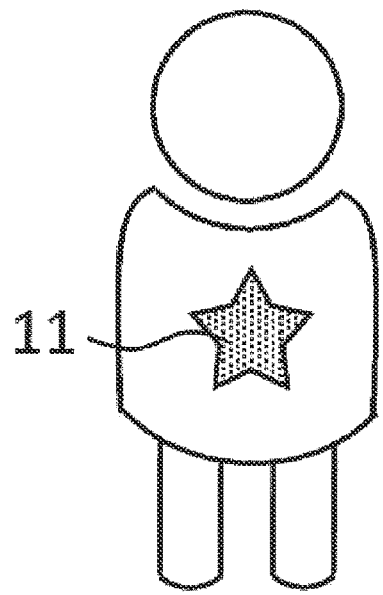
FIG. 4A is a diagram for explaining an example of a display position and a display size of advertising displayed on an avatar.
Figure 4B:
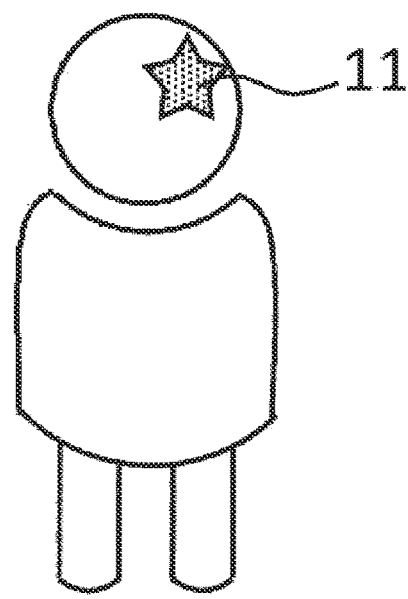
FIG. 4B is a diagram for explaining another example of a display position and a display size of advertising displayed on an avatar.

The advertising display unit 221 refers to FIGS. 4A to 4C and displays advertising 11 corresponding to advertising data stored in the advertising information database 222 on an avatar 10 (a portion visible from the outside such as a surface of the body of the avatar 10 or a surface of clothing worn by the avatar 10) operated by the user in the virtual reality space.

The advertising display unit 221 may be capable of selecting and/or modifying, based on an operation by the user, at least one of the number of pieces of advertising displayed on the avatar, display sizes of the pieces of advertising, display positions of the pieces of advertising, and display times of the pieces of advertising. Specifically, for example, the advertising 11 is given a patch shape, and by having the avatar 10 grasp edges of the advertising 11 with the patch shape and open or close the patch shape based on an operation by the user, the display size of the advertising 11 may be freely selectable or modifiable. In addition, by having the avatar 10 grasp the advertising 11 with the patch shape and paste the advertising 11 with the patch shape to or detach the patch shape from a portion visible from the outside such as a surface of the body of the avatar 10 or a surface of clothing worn by the avatar 10 based on an operation of the user, the number of pieces of the advertising 11 displayed, display positions of the pieces of advertising 11, and display times of the pieces of advertising 11 may be freely selectable or modifiable. When the avatar 10 tries on (tentatively pastes) the advertising 11 with a patch shape based on an operation of the user, the advertising fee calculating unit 223 to be described later may present the user with an assumed advertising fee in accordance with a display size or a display position.

Since a user can freely select and modify, at any time, the number of pieces of the advertising 11 displayed on the avatar 10, display sizes of pieces of the advertising 11, display positions of pieces of the advertising 11, and display times of pieces of the advertising 11, the user can construct an advertising display style to the user's liking, and since an advertising fee changes accordingly as will be described later, a mechanism of displaying the advertising 11 on the avatar 10 only after the user is convinced to do so can be constructed.

The contact information acquiring unit 222 acquires information on contact times of the avatar 10 on which the advertising 11 is displayed in the virtual reality space with other avatars and the number of the other avatars. The information on contact times and the number of the other avatars acquired by the contact information acquiring unit 222 is stored in the advertising use information database 233.

Figure 5B:
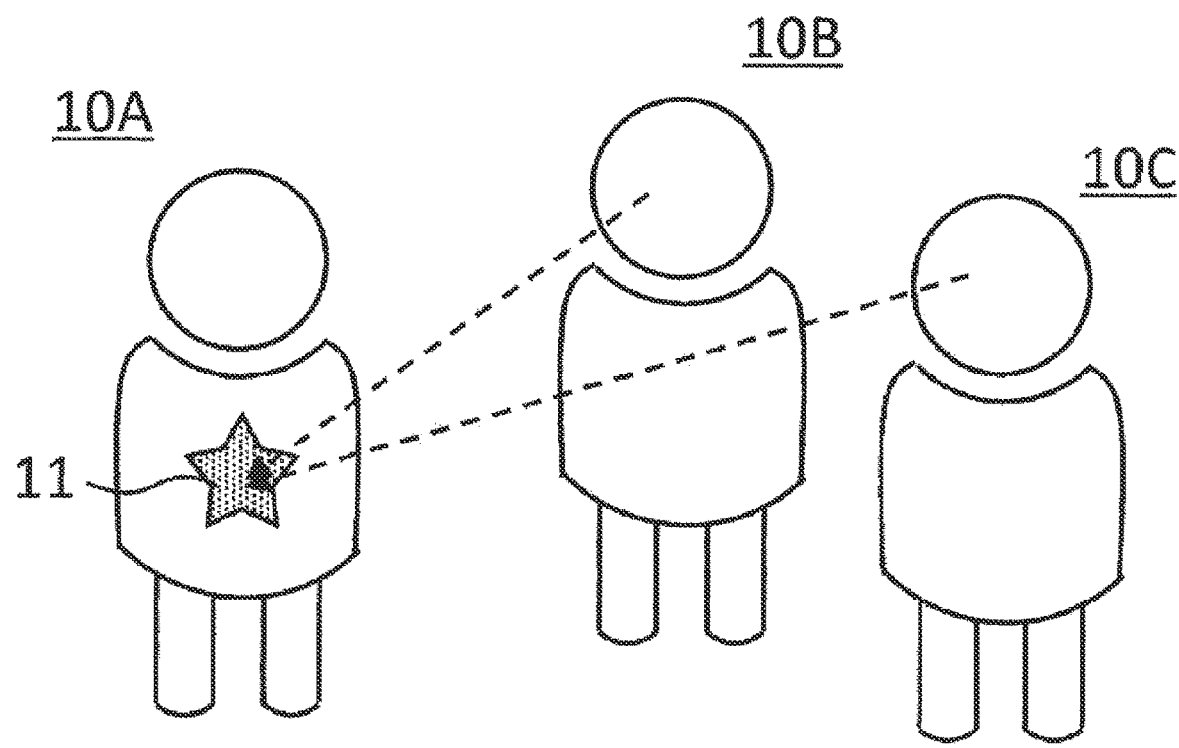
FIG. 5B is a diagram for explaining another aspect of a contact among avatars.
Figure 5C:
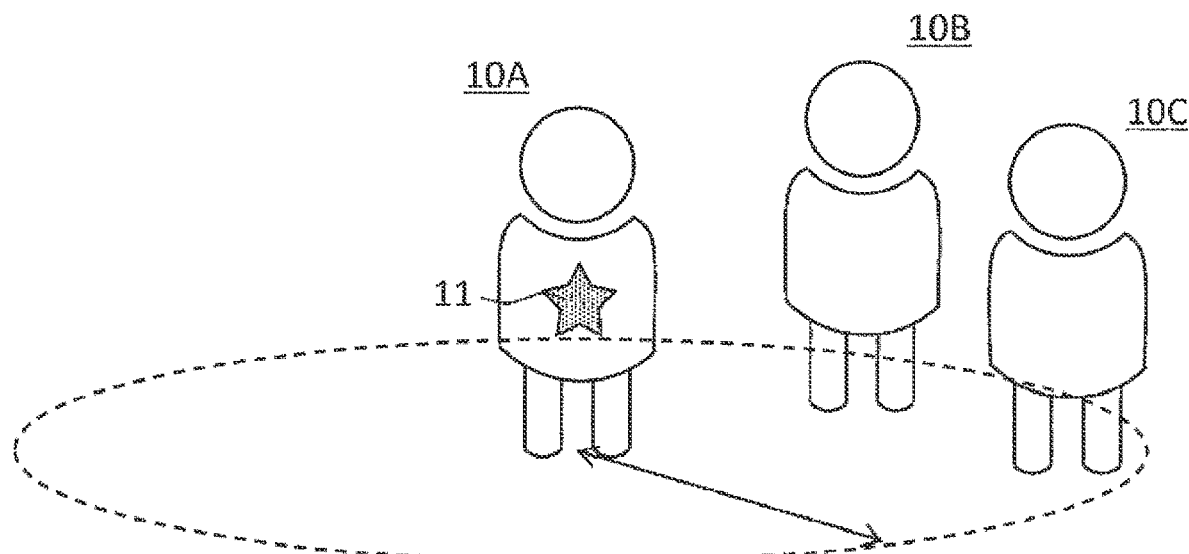
FIG. 5C is a diagram for explaining another aspect of a contact among avatars.

Specifically, for example, the contact information acquiring unit 222 may refer to FIG. 5A to determine whether or not an avatar 10A on which the advertising 11 is displayed is in a state of conversation with other avatars 10B and 10C based on a presence or absence of an utterance by each of the avatars 10A to 10C in the virtual reality space and acquire, as a contact time, a time during which the avatar 10A on which the advertising 11 is displayed is in a state of conversation with the other avatars 10B and 10C. In addition, the contact information acquiring unit 222 may refer to FIG. 5B to determine whether or not the other avatars 10B and 10C are continuously gazing on the advertising 11 displayed on the avatar 10A based on position coordinates of an eye mark of each of the avatars 10A to 10C in the virtual reality space and acquire, as a contact time, a time during which the other avatars 10B and 10C continuously gaze on the advertising 11 displayed on the avatar 10A. Furthermore, the contact information acquiring unit 222 may refer to FIG. 5C to determine whether or not the avatar 10A on which the advertising 11 is displayed and the other avatars 10B and 10C are in a state where the avatars have approached each other within a distance determined in advance based on position coordinates of each of the avatars 10A to 10C in the virtual reality space and acquire, as a contact time, a time during which the avatar 10A on which the advertising 11 is displayed and the other avatars 10B and 10C are in a state where the avatars have approached each other within a distance determined in advance.

Based on the information on contact times and the number of other avatars acquired by the contact information acquiring unit 222, the advertising fee calculating unit 223 calculates advertising fees to be respectively applied to a user A who operates the avatar 10A on which the advertising 11 is displayed and other users B and C who operate the other avatars 10B and 10C having come into contact with the avatar 10A. In this case, an "advertising fee" may be a coupon or points, electronic money, cryptocurrency, or the like which can be used for payment in the virtual reality space or a coupon or points, electronic money, cryptocurrency, cash, or the like which can be used for payment in the real world.

Due to advertising fees being applied according to a calculation based on the contact times of the avatar 10A on which the advertising 11 is displayed in the virtual reality space with the other avatars 10B and 10C, the user A operating the avatar 10A on which the advertising 11 is displayed is motivated to come into contact with the other avatars 10B and 10C, and since advertising fees are also applied to the other users B and C operating the other avatars 10B and 10C which the avatar 10A had come into contact, the users B and C around the user A can favorably accept contact. Therefore, due to promotion of interchange with the avatar 10A on which the advertising 11 is displayed in the virtual reality space, awareness of the advertising can be generated and the advertising can be disseminated in an effective manner through interchange among the avatars. In addition, since actual recognition of the advertising by a user can be confirmed by contact, advertising effectiveness can be measured and a structure of application of an advertising fee as compensation can be clarified even to advertisers.

As a modification, based on the information on contact times and the number of other avatars acquired by the contact information acquiring unit 222, the advertising fee calculating unit 223 may calculate advertising fees to be respectively applied to the user A who operates the avatar 10A on which the advertising 11 is displayed and the other users B and C who operate the other avatars 10B and 10C having come into contact with the avatar 10A and, at the same time, calculate an advertising fee to be applied to a world owner providing a field (world) in which the avatars 10A to 10C are staying in the virtual reality space.

The advertising fee calculating unit 223 may calculate the advertising fees by further taking into consideration at least one of: the number of pieces of advertising 11 displayed on the avatar 10A; display sizes of the pieces of advertising 11; display positions of the pieces of advertising 11; and display times of the pieces of advertising 11. Specifically, for example, since the larger the number of pieces of advertising 11 displayed on the avatar 10A, the more easily the advertising 11 is recognized by the other avatars 10B and 10C, the advertising fee applied to each of the users A to C may be increased. In addition, since the larger the display size of the advertising 11 displayed on the avatar 10A, the more easily the advertising 11 is recognized by the other avatars 10B and 10C, the advertising fee applied to each of the users A to C may be increased. Furthermore, since the closer the display position of the advertising 11 is to a face portion of the avatar 10, the more easily the advertising 11 is recognized by the other avatars 10B and 10C, the advertising fee applied to each of the users A to C may be increased. In addition, since the longer the display time of the advertising 11 displayed on the avatar 10A, the more easily the advertising 11 is recognized by the other avatars 10B and 10C, the advertising fee applied to each of the users A to C may be increased.

In other words, the advertising fee calculating unit 223 may calculate the advertising fee to be applied to each of the users A to C based on at least one element (=variable element that can be freely selected or modified by the user A) among the number of pieces of advertising 11 displayed on the avatar 10A, display sizes of the pieces of advertising 11, display positions of the pieces of advertising 11, and display times of the pieces of advertising 11 as well as the contact times of the avatar 10A on which the advertising 11 is displayed in the virtual reality space with the other avatars 10B and 10C and the number of avatars (=incidental eventual element).

The advertising display unit 221 may be capable of copying the advertising 11 displayed on the avatar 10A onto the other avatars 10B and 10C based on input operations of the other users B and C operating the other avatars 10B and 10C. Specifically, for example, based on operations by the other users B and C, the advertising 11 displayed on the avatar 10A can be copied onto the other avatars 10B and 10C in response to the other avatars 10B and 10C coming into contact with the advertising 11 for a few seconds determined in advance. The advertising display unit 221 may be capable of selecting and/or modifying, based on operations by the other users B and C, at least one of the display sizes of pieces of the advertising copied onto the other avatars 10B and 10C, display positions of pieces of the advertising, and display times of pieces of the advertising. By simply copying the advertising 11 displayed on the avatar 10A onto the other avatars 10B and 10C, the number of displayed pieces of the advertising 11 itself in the virtual reality space increases and advertising effectiveness can be increased. In addition, since copying is performed based on operations by the users B and C being copy destinations, a mechanism in which the users B and C being copy destinations copy advertising onto the avatars 10B and 10C only after being convinced to do so can be constructed.

The advertising fee calculating unit 223 may acquire copy information indicating that the advertising 11 displayed on the avatar 10A has been copied onto the other avatars 10B and 10C from the advertising use information database 233 and calculate, based on the copy information, advertising fees to be respectively applied to the user A who operates the avatar 10A being a copy source and the users B and C who operate the avatars 10B and 10C being copy destinations.

Figure 6:
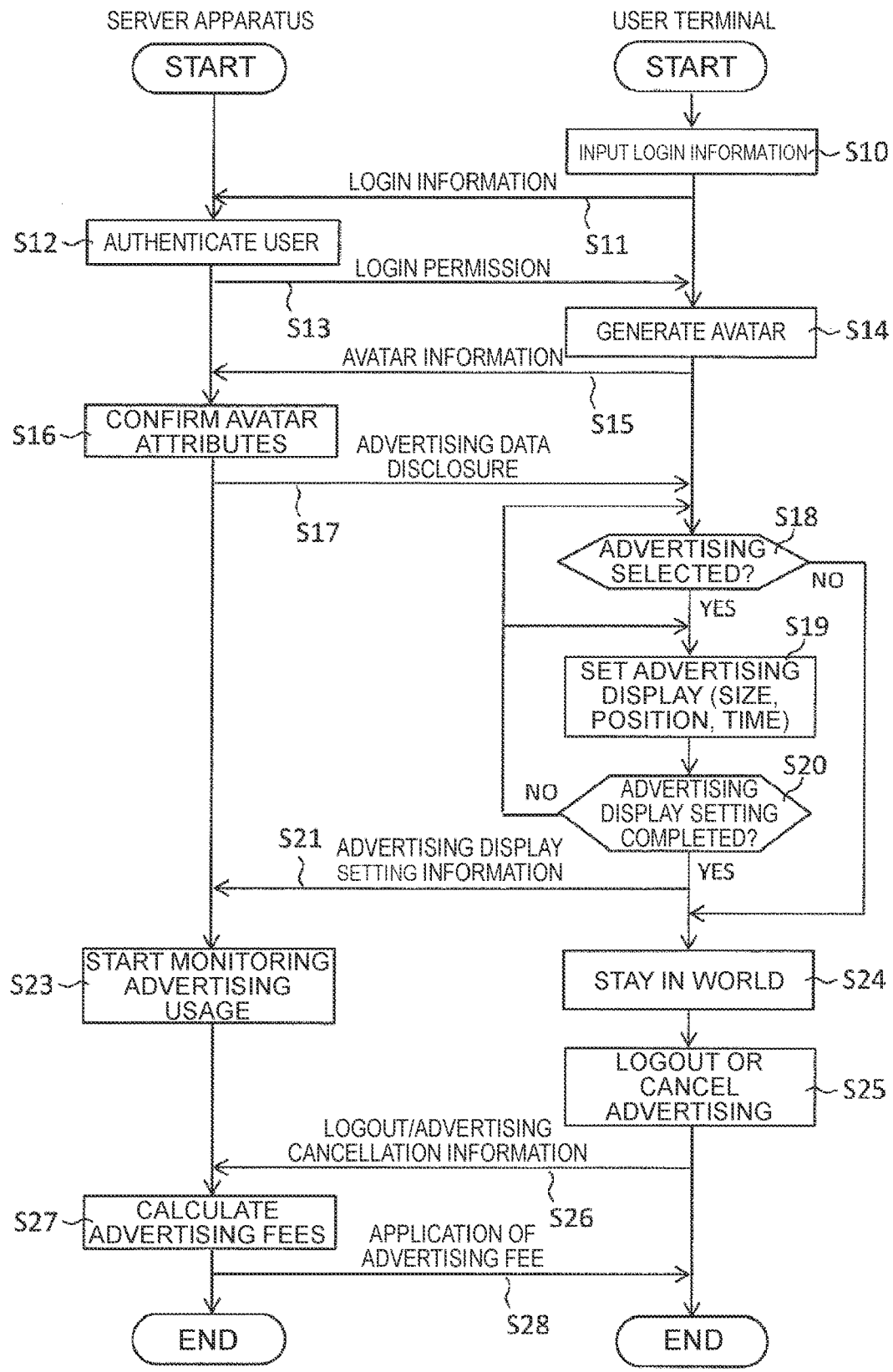
FIG. 6 is a flow chart showing an example of a basic operation of the advertising display system.

Next, a basic operation of the advertising display system 1 configured as described above will be described with reference to FIG. 6. FIG. 6 is a flow chart showing an example of a basic operation of the advertising display system 1.

As shown in FIG. 6, when using the advertising display system 1 according to the present embodiment, first, when login information is input on the user terminal 3 (step S10), the input login information is transmitted from the user terminal 3 to the server apparatus 2 (step S11), and processing of user authentication is performed by the server apparatus 2 (step S12). When the user authentication is successful, login permission is sent from the server apparatus 2 to the user terminal 3 (step S13).

Next, when a user given the login permission operates the user terminal 3 and generates the avatar 10 in the virtual reality space (step S14), avatar information (avatar attributes and the like) of the avatar 10 operated by the user is transmitted from the user terminal 3 to the server apparatus 2 (step S15), and confirmation of the avatar information (for example, confirmation that the avatar attributes are consistent with avatar attributes designated by an advertiser) is performed by the server apparatus 2 (step S16). Once the avatar information is confirmed, advertising data is sent from the server apparatus 2 to the user terminal 3 to be disclosed (step S17).

Next, when the user operates the user terminal 3 and selects one or a plurality of pieces of advertising 11 corresponding to the disclosed advertising data (step S18: YES), based on the operation by the user, the advertising display unit 221 performs display setting (for example, selection and/or modification of at least one of a display size, a display position, and a display time) of the selected advertising 11 (step S19).

Subsequently, the user terminal 3 queries the user as to whether or not the display setting of the selected advertising 11 has been completed (step S20). When the display setting of the advertising 11 has not been completed (step S20: NO), a return is made to step S18 or step S19 to perform display setting once again.

When the user operates the user terminal 3 and answers that the display setting of the advertising 11 has been completed in step S20 (step S20: YES), advertising display setting information is transmitted from the user terminal 3 to the server apparatus 2 (step S21), and the advertising display unit 221 of the server apparatus 2 displays the advertising 11 in a mode in accordance with the advertising display setting information on the avatar 10 operated by the user in the virtual reality space. In addition, the server apparatus 2 starts monitoring advertising usage by the avatar 10 (step S23). The monitored advertising usage is stored in the advertising use information database 233. The user operates the user terminal 3 and causes the avatar 10 on which the advertising 11 is displayed to stay in a world of the virtual reality space (step S24).

On the other hand, returning to step S18, when none of the pieces of advertising 11 corresponding to the disclosed advertising data are selected by the user (step S18: NO), the advertising 11 is not displayed on the avatar 10 operated by the user in the virtual reality space. The user operates the user terminal 3 and causes the avatar 10 on which the advertising 11 is not displayed to stay in the world of the virtual reality space (step S24).

Next, when the user operates the user terminal 3 and performs logout or an advertising cancellation operation (for example, an operation of removing, from the avatar 10, the advertising 11 with a patch shape being pasted on the avatar 10) (step S25), logout information or advertising cancellation information is transmitted from the user terminal 3 to the server apparatus 2 (step S26), the advertising fee calculating unit 223 of the server apparatus 2 calculates an advertising fee to be applied to a user based on the advertising usage stored in the advertising use information database 233 (step S27), and information on the advertising fee is sent from the server apparatus 2 to the user terminal 3 (step S28).

According to the present embodiment described above, since the user can freely select and modify, at any time, the number of pieces, display sizes, display positions, and display times of the advertising 11 displayed on the avatar 10, the user can construct an advertising display style to the user's liking, and since an advertising fee changes accordingly, a mechanism of displaying the advertising 11 on the avatar 10 only after the user is convinced to do so can be constructed.

Figure 7:
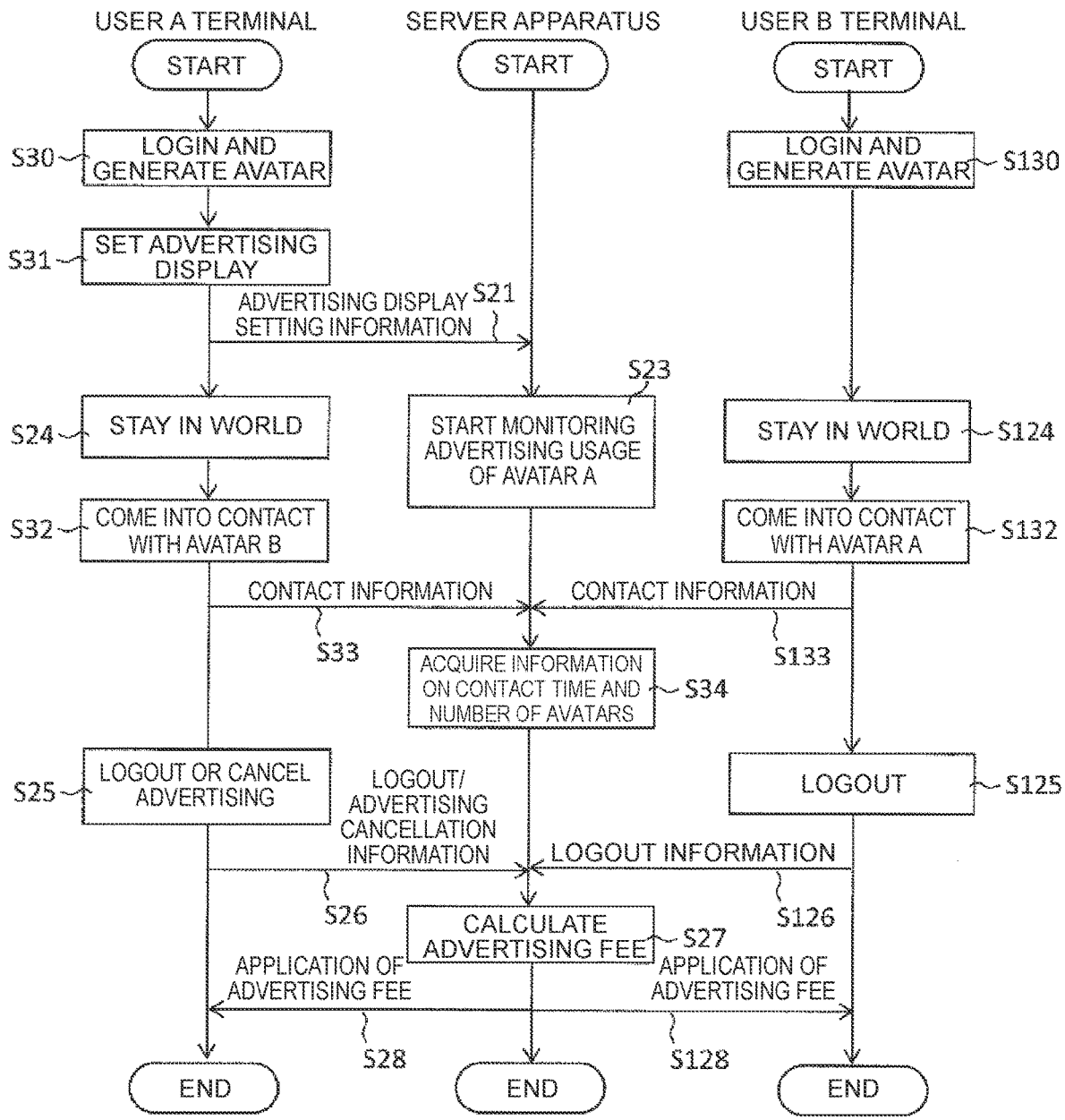
FIG. 7 is a flow chart showing an example of an operation of the advertising display system when an avatar on which advertising is displayed comes into contact with another avatar.

Next, an operation of the advertising display system 1 when the avatar 10A on which the advertising 11 is displayed comes into contact with another avatar 10B will be described with reference to FIG. 7. FIG. 7 is a flow chart showing an example of an operation of the advertising display system 1.

As shown in FIG. 7, first, the user A operates his/her own user terminal 3 (hereinafter, may be referred to as "user A terminal"), performs login and generates the avatar 10A in the virtual reality space (step S30), and performs display setting of the advertising 11 (step S31). In this case, steps S30 to S31 are similar to steps S10 to S20 in the flow chart shown in FIG. 6 and a detailed description will be omitted.

When advertising display setting has been completed at the user A terminal, advertising display setting information is transmitted from the user A terminal to the server apparatus 2 (step S21), and the advertising display unit 221 of the server apparatus 2 displays the advertising 11 in a mode in accordance with the advertising display setting information on the avatar 10A operated by the user A in the virtual reality space. In addition, the server apparatus 2 starts monitoring advertising usage by the avatar 10A (step S23). The monitored advertising usage is stored in the advertising use information database 233. The user A operates the user A terminal and causes the avatar 10A on which the advertising 11 is displayed to stay in a world of the virtual reality space (step S24).

In parallel with the operation by the user A, as shown in FIG. 7, the user B operates his/her own user terminal 3 (hereinafter, may be referred to as "user B terminal"), performs login, and generates the avatar 10B in the virtual reality space (step S130). In this case, step S130 is similar to steps S10 to S18: NO in the flow chart shown in FIG. 6 and a detailed description will be omitted. The user B operates the user B terminal and causes the avatar 10B on which the advertising 11 is not displayed to stay in the world of the virtual reality space (step S124).

When the avatar 10A on which the advertising 11 is displayed during its stay in the world comes into contact with the other avatar 10B (steps S32 and S132), contact information is sent from the user A terminal and the user B terminal to the server apparatus 2 (steps S33 and S133). Based on the contact information received from the user A terminal and the user B terminal, the contact information acquiring unit 222 of the server apparatus 2 acquires information on a contact time of the avatar 10A on which the advertising 11 is displayed in the virtual reality space with the other avatar 10B and the number of the other avatars (step S34). The information on the contact time and the number of the other avatars acquired by the contact information acquiring unit 222 is stored in the advertising use information database 233.

Subsequently, when the user A operates the user A terminal and performs logout or an advertising cancellation operation (for example, an operation of removing, from the avatar 10A, the advertising 11 with a patch shape being pasted on the avatar 10A) (step S25), logout information or advertising cancellation information is transmitted from the user A terminal to the server apparatus 2 (step S26). In addition, when the user B operates the user B terminal and performs logout (step S125), logout information is transmitted from the user B terminal to the server apparatus 2 (step S126).

In addition, based on the information on the contact time and the number of the other avatars acquired by the contact information acquiring unit 222, the advertising fee calculating unit 223 of the server apparatus 2 calculates advertising fees to be respectively applied to the user A who operates the avatar 10A on which the advertising 11 is displayed and the other user B who operates the other avatar 10B having come into contact with the avatar 10A (step S27), and information on the advertising fees is sent to the user A terminal and the user B terminal from the server apparatus 2 (steps S28 and S128).

According to the present embodiment described above, an advertising fee can be calculated based on a contact time of the avatar 10A on which the advertising 11 is displayed in the virtual reality space with the other avatar 10B and the number of the other avatars. In addition, an advertising fee is applied not only to the user A operating the avatar 10A on which advertising 11 is displayed but also to the other user B operating the other avatar 10B which the avatar 10A had come into contact according to a calculation based on the contact time. Accordingly, the user A operating the avatar 10A on which advertising 11 is displayed is motivated to come into contact with the other avatar 10B, and since an advertising fee is also applied to the other user B operating the other avatar 10B which the avatar 10A had come into contact, the other user B can also favorably accept contact. Therefore, due to promotion of interchange with the avatar 10A on which the advertising 11 is displayed in the virtual reality space, awareness of the advertising can be generated and the advertising can be disseminated in an effective manner through interchange among the avatars. Furthermore, since actual recognition of the advertising by a user can be confirmed by contact, advertising effectiveness can be measured and a structure of application of an advertising fee as compensation can be clarified even to advertisers.

Figure 8:
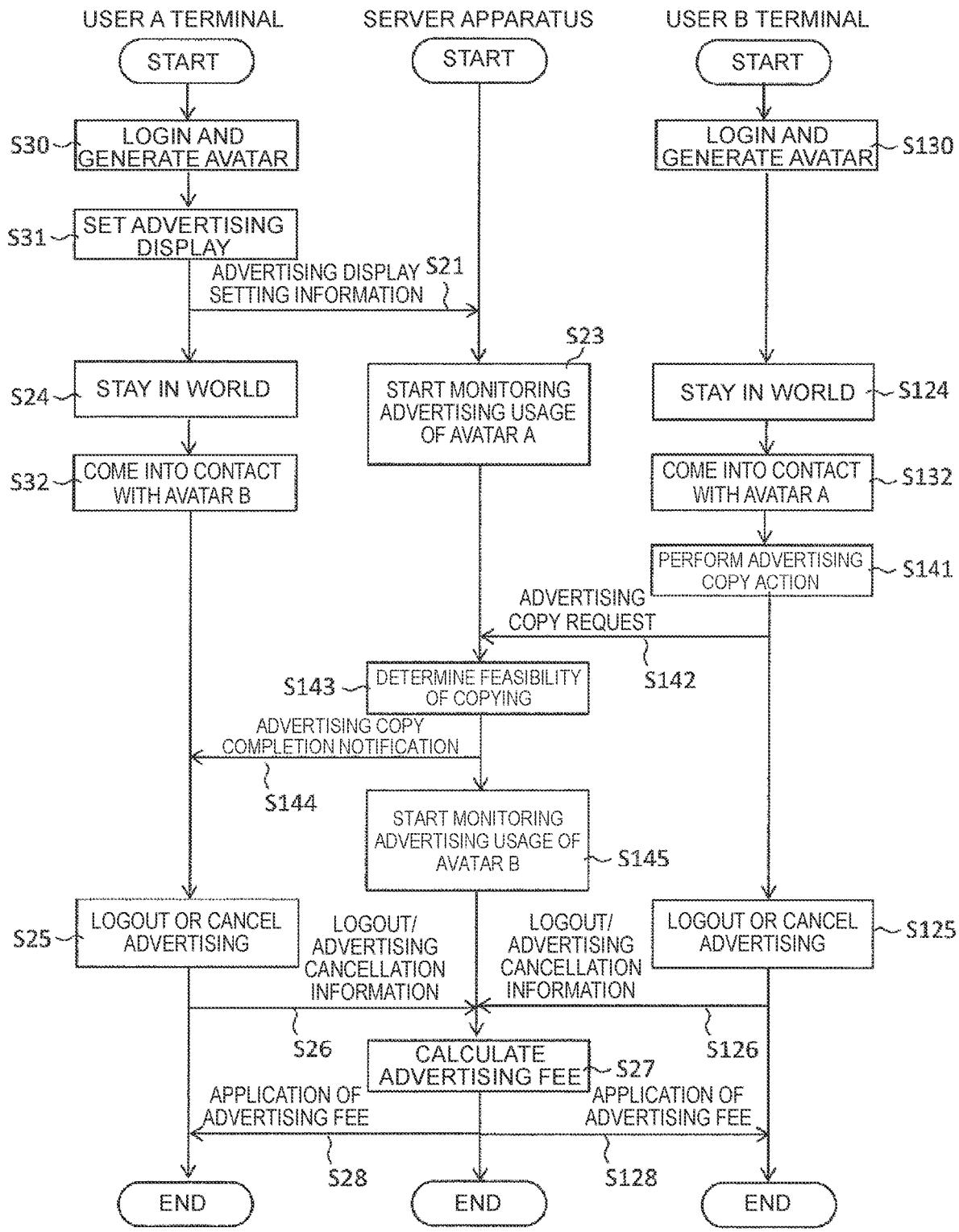
FIG. 8 is a flow chart showing an example of an operation of the advertising display system when advertising is copied from an avatar on which the advertising is displayed to another avatar.

Next, an operation of the advertising display system 1 when the advertising 11 is copied from the avatar 10A on which the advertising 11 is displayed to the other avatar 10B will be described with reference to FIG. 8. FIG. 8 is a flow chart showing an example of an operation of the advertising display system 1.

As shown in FIG. 8, first, the user A operates his/her own user terminal 3 (hereinafter, may be referred to as "user A terminal"), performs login and generates the avatar 10A in the virtual reality space (step S30), and performs display setting of the advertising 11 (step S31). In this case, steps S30 to S31 are similar to steps S10 to S20 in the flow chart shown in FIG. 6 and a detailed description will be omitted.

When advertising display setting has been completed at the user A terminal, advertising display setting information is transmitted from the user A terminal to the server apparatus 2 (step S21), and the advertising display unit 221 of the server apparatus 2 displays the advertising 11 in a mode in accordance with the advertising display setting information on the avatar 10A operated by the user A in the virtual reality space. In addition, the server apparatus 2 starts monitoring advertising usage by the avatar 10A (step S23). The monitored advertising usage is stored in the advertising use information database 233. The user A operates the user A terminal and causes the avatar 10A on which the advertising 11 is displayed to stay in a world of the virtual reality space (step S24).

In parallel with the operation by the user A, as shown in FIG. 7, the user B operates his/her own user terminal 3 (hereinafter, may be referred to as "user B terminal"), performs login, and generates the avatar 10B in the virtual reality space (step S130). In this case, step S130 is similar to steps S10 to S18: NO in the flow chart shown in FIG. 6 and a detailed description will be omitted. The user B operates the user B terminal and causes the avatar 10B on which the advertising 11 is not displayed to stay in the world of the virtual reality space (step S124).

After the avatar 10A on which the advertising 11 is displayed comes into contact with the other avatar 10B during a stay in the world (steps S32 and step S132), when the user B operates the user B terminal and performs an advertising copy action for copying the advertising 11 (for example, an action by the avatar 10B of coming into contact for a few seconds determined in advance with the advertising 11 displayed on the avatar 10A) (step S141), an advertising copy request is sent from the user B terminal to the server apparatus 2 (step S142).

The advertising display unit 221 of the server apparatus 2 determines feasibility of copying (step S143) and, when copying is feasible, the advertising display unit 221 also displays the advertising 11 on the avatar 10B operated by the user B in the virtual reality space (in other words, copies the advertising 11 displayed on the avatar 10A to the avatar 10B). Copy information indicating that the advertising 11 displayed on the avatar 10A has been copied onto the avatar 10B is stored in the advertising use information database 233 and an advertising copy completion notification is sent from the server apparatus 2 to the user A terminal (step S144). In addition, the server apparatus 2 starts monitoring advertising usage by the avatar 10B being the copy destination (step S145). The monitored advertising usage is stored in the advertising use information database 233.

Subsequently, when the user A operates the user A terminal and performs logout or an advertising cancellation operation (for example, an operation of removing, from the avatar 10A, the advertising 11 with a patch shape being pasted on the avatar 10A) (step S25), logout information or advertising cancellation information is transmitted from the user A terminal to the server apparatus 2 (step S26). In addition, when the user B operates the user B terminal and performs logout or an advertising cancellation operation (for example, an operation of removing, from the avatar 10B, the advertising 11 with a patch shape being pasted on the avatar 10B) (step S125), logout information or advertising cancellation information is transmitted from the user B terminal to the server apparatus 2 (step S126).

In addition, the advertising fee calculating unit 223 of the server apparatus 2 acquires copy information indicating that the advertising 11 displayed on the avatar 10A has been copied onto the other avatar 10B from the advertising use information database 233 and calculates, based on the copy information, advertising fees to be respectively applied to the user A who operates the avatar 10A being a copy source and the user B who operates the avatar 10B being a copy destination (step S27), and information on the advertising fees is sent from the server apparatus 2 to the user A terminal and the user B terminal (step S28 and S128).

According to the present embodiment described above, since the advertising 11 displayed on the avatar 10A can be readily copied onto the other avatar 10B, the number of displayed pieces of advertising itself in the virtual reality space increases and advertising effectiveness can be increased. In addition, a mechanism in which the user B being a copy destination copies advertising onto the avatar 10B only after being convinced to do so can be constructed. In addition, since copying is performed based on an operation (step S141 in FIG. 8) by the user B being the copy destination who desires to copy the advertising, convincingness perceived by the user B being the copy destination is enhanced, advertising is no longer imposed from the user A being a copy source or an advertiser, defamation risks to the advertising and the brand can be reduced, and a mechanism effective for both users and advertisers can be realized.

It is to be understood that the description of the embodiment presented above and the disclosure of the drawings merely represent an example for describing the invention as set forth in the scope of claims and that the invention set forth in the scope of claims is not limited by the description of the embodiment presented above and the disclosure of the drawings. Components of the embodiment described above may be combined in any way without departing from the true scope and spirit of the invention.

In addition, while at least a part of the advertising display system 1 according to the present embodiment may be constituted of a computer, a program for causing the computer to realize at least a part of the advertising display system 1 and a computer-readable recording medium which records the program in a non-transitory manner are also subject to protection in the present case.

The invention claimed is:

1. An advertising display system, comprising:
at least one processor configured to:
display advertising on an avatar operated by a user in a virtual reality space;
acquire information on contact times of the avatar in the virtual reality space with other avatars operated by other users and the number of the other avatars; and
send, to a terminal of the user and other terminals of the other users, information on an advertising fee according to the information on the contact times and the number of the other avatars,
wherein the at least one processor is configured to:
determine whether or not the other avatars are continuously gazing on the advertising displayed on the avatar based on position coordinates of an eye mark of each of the avatars in the virtual reality space and acquire, as a contact time, a time during which the other avatars continuously gaze on the advertising displayed on the avatar, or
determine whether or not the avatar and the other avatars are in a state where the avatars have approached each other within a distance determined in advance based on position coordinates of each of the avatars in the virtual reality space and acquire, as a contact time, a time during which the avatar and the other avatars are in a state where the avatars have approached each other within the distance determined in advance.

2. The advertising display system according to claim 1, wherein the at least one processor is configured to:
calculate the advertising fee by further taking into consideration at least one of the number of pieces of advertising displayed on the avatar, display sizes of the pieces of advertising, display positions of the pieces of advertising, and display times of the pieces of advertising.

3. The advertising display system according to claim 2, wherein the at least one processor is configured to:
select and/or modify, based on an operation by the user, at least one of the number of pieces of advertising displayed on the avatar, display sizes of the pieces of advertising, display positions of the pieces of advertising, and display times of the pieces of advertising.

4. The advertising display system according to claim 1, wherein the at least one processor is configured to:
copy, based on an operation by the other users, advertising displayed on the avatar onto the other avatars.

5. An advertising display method, comprising:
displaying advertising on an avatar operated by a user in a virtual reality space;
acquiring information on contact times of the avatar in the virtual reality space with other avatars operated by other users and the number of the other avatars; and
sending, to a terminal of the user and other terminals of the other users, information on an advertising fee according to the information on the contact times of the avatar in the virtual reality space with other avatars and the number of the other avatars,
wherein acquiring information on contact times of the avatar comprises:
determining whether or not the other avatars are continuously gazing on the advertising displayed on the avatar based on position coordinates of an eye mark of each of the avatars in the virtual reality space and acquiring, as a contact time, a time during which the other avatars continuously gaze on the advertising displayed on the avatar, or
determining whether or not the avatar and the other avatars are in a state where the avatars have approached each other within a distance determined in advance based on position coordinates of each of the avatars in the virtual reality space and acquiring, as a contact time, a time during which the avatar and the other avatars are in a state where the avatars have approached each other within the distance determined in advance.

6. The advertising display method according to claim 5, wherein
calculating an advertising fee comprises calculating the advertising fee by further taking into consideration at least one of the number of pieces of advertising displayed on the avatar, display sizes of the pieces of advertising, display positions of the pieces of advertising, and display times of the pieces of advertising.

7. The advertising display method according to claim 6, the method further comprising:
selecting and/or modifying, based on an operation by the user, at least one of the number of pieces of advertising displayed on the avatar, display sizes of the pieces of advertising, display positions of the pieces of advertising, and display times of the pieces of advertising.

8. The advertising display method according to claim 5, the method further comprising:
copying, based on an operation by the other users, advertising displayed on the avatar onto the other avatars.

* * * * *